March 21, 1961 G. J. SHELDON 2,975,785
OPTICAL VIEWING INSTRUMENT
Filed Sept. 26, 1957 2 Sheets-Sheet 1
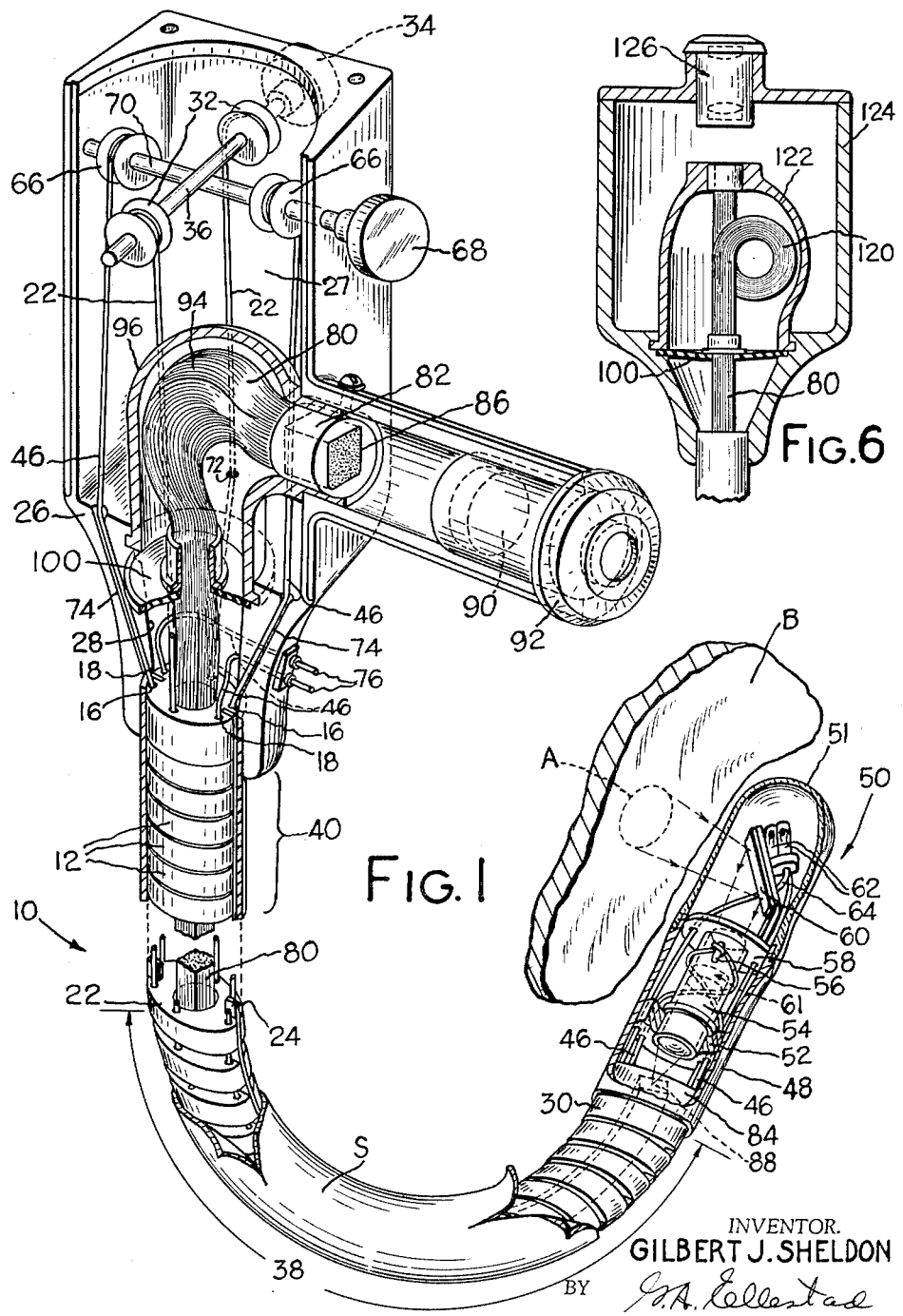
INVENTOR.
GILBERT J. SHELDON
BY
ATTORNEYS

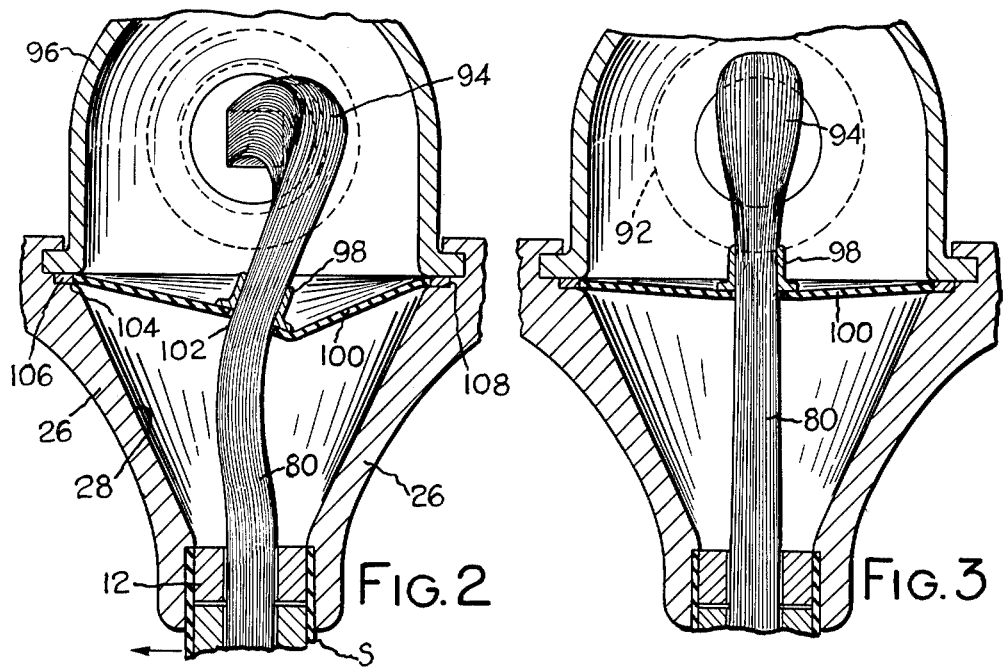
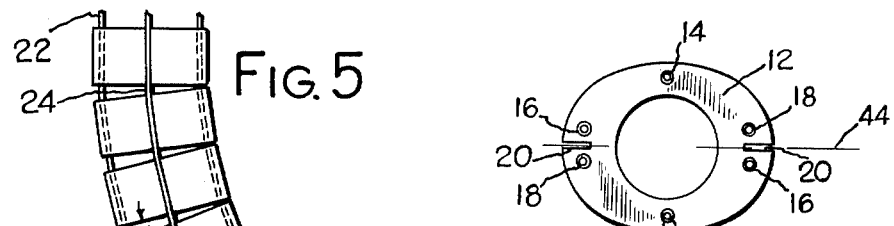
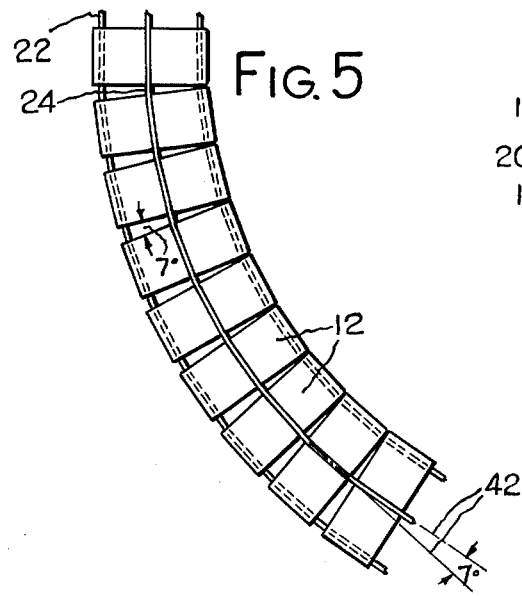
INVENTOR.
GILBERT J. SHELDON

United States Patent Office 2,975,785
Patented Mar. 21, 1961

2,975,785

OPTICAL VIEWING INSTRUMENT

Gilbert J. Sheldon, Irondequoit, N.Y., assignor to Bausch & Lomb Optical Company, Rochester, N.Y., a corporation of New York Filed Sept. 26, 1957, Ser. No. 686,320

11 Claims. (Cl. 128—6)

The present invention relates generally to optical viewing devices for exploring or inspecting interior and inaccessible cavities, parts of pipes and machinery, and has particular reference to diagnostic instruments such as endoscopic instruments for viewing the various cavities such as body cavities, or the like.

Generally, endoscopes are equipped with an optical system comprising a comparatively large number of aligned optical elements or lenses which transmit the image to an eyepiece located on the proximal end of the instrument. The endoscope tube itself generally is composed of a number of tubular sleeves each of which is provided with two or more of the optical elements or lenses and during limited flexing of the tube, the lenses will remain somewhat aligned. Since some of the image forming light rays impinging upon each air glass surface of each lens are lost by reflection, it will be obvious that for endoscopes which require relatively long tubes and many lenses, very little of the light will actually reach the eyepiece. A particular example of this is the gastroscope, which if it is of a length in the neighborhood of 30 inches, may require up to 60 lens elements and if a small percentage of loss in light transmission is attributed to each lens element, a simple step of computing will indicate the relatively small amount of light finally reaching the eyepiece. Therefore, it is an object of the present invention to provide an endoscope with a novel optical system arrangement for permitting a greater percentage of the image light rays to reach the eyepiece for observation purposes.

Another disadvantage of the present-day endoscopes is in their inability to flex, in a controlled manner, to any great extent and with any degree of universality. This stems from the deficiencies of the optical system used in these instruments and the tube structure itself. As to the optical system, the various lenses associated with each tubular sleeve are fixed within the sleeve and, consequently, the alignment of the optical system will be seriously jeopardized if the axial angular relationship between the sleeves is too great. In fact, the total angular relationship for the endoscope tube must be held to within a few degrees of arc. As to the endoscope tube, generally only one movement is available, that is, the tube may be flexed in one direction, and then only to a very limited extent. In order to view other wall portions of the cavity under inspection, it is necessary to either rotate the endoscope about the axis of the tube or to extract the instrument from the cavity and canal leading thereto and again insert the instrument, all to the great discomfort of the patient. Even with this expedient, only adjacent wall portions will come under the purview of the endoscope optical probe. Therefore, another object of the invention is to provide an endoscope tube structure which is adapted to be flexed in at least two directions and with any desired extent of curvature, all under accurately controlled settings.

Another object of the present invention is to combine a flexible optical system with a flexible tube structure for permitting endoscopic observation of remote and expansive areas of cavities under study.

These and other objects and advantages reside in certain novel features of construction, arrangement and combination of parts as will hereinafter be more fully described, pointed out in the appended claims, and will appear when taken in conjunction with the drawing, wherein:

Fig. 1 is a perspective view, with parts broken away in separated relation, of the improved endoscope showing the same in viewing position in the stomach of a patient;

Figs. 2 and 3 are fragmentary views of a portion of the control housing and the optical system illustrating the shapes of the glass fiber bundle under two conditions of operation;

Fig. 4 is a top plan view of one of the tube elements utilized in the sheath;

Fig. 5 is an elevational view of a detail of the sheath portion of the endoscope; and Fig. 6 is a fragmentary view showing another form which the glass fiber bundle may assume.

Referring now to the drawings, there is shown an endoscope sheath generally indicated by the reference numeral 10 and comprising a plurality of tube elements 12 arranged in an end to end relationship. As shown in Figs. 1 and 4, each of the tube elements is oval in cross-section and is formed with openings which may be in the form of apertures 14, 16, 18 and slots 20. When the tube elements are arranged in axial alignment, the apertures 14, 16, 18 of each of the tube elements are in axial alignment with the corresponding apertures in the preceding tube elements and the slots 20 of each tube element are in axial alignment with the corresponding slots in the preceding tube elements.

The apertures 14 in each of the tube elements are arranged in two series of aligned openings, each series being diametrically opposite one another on the short axis of the oval cross-section. Each series of apertures 14 is adapted to accommodate a flexible control cable 22 which extends through the length of the sheath. The slots 20 are diametrically opposite one another on the long axis of the oval cross-section and are adapted to receive flexure strips 24 preferably of spring material which are secured to each of the tube elements by any suitable means such as by welding, cementing or tongue and groove means.

One end of the sheath 10 is secured to a control housing 26 and has its interior in communication with the interior chamber 27 of the housing by means of an opening 28 formed therein. The control housing serves to support various control structures for the present endoscope and comprises two mating castings, one of which is shown and the other removed for purposes of illustrating the various structures within the chamber 27. One end of each of the cables 22 is secured to the terminal tube element 30 of the sheath and the other ends are secured and looped around a pair of pulleys 32 positioned within the chamber 27 and which are suitably connected to a control knob 34 by a shaft 36. The shaft 36 may be rotatably secured and axially immobilized to the walls of the housing by any suitable means.

In operation, rotation of the knob 34 in either direction will correspondingly impart a pulling force to one of the cables 22 and release, correspondingly, tension in the other cable. Such a pulling force will flex the terminal section 38 (see Fig. 1) of the sheath in either direction on opposite sides of the longitudinal axis of the sheath 10, depending upon which of the cables 22 is pulled. In actual practice, the terminal section 38 will comprise relatively few tube elements in relation to the total number of the elements utilized. While this arrangement is preferred, it is not to be considered a limiting factor for the scope of the invention. The sheath 10 may be formed with a hollow cylinder section adjacent the control housing with only the terminal section flexible, or the entire sheath may be made flexible. In the present invention, as will be described in more detail hereinafter, the section 40 of the sheath between the housing 26 and the terminal section 38 has limited flexing ability and only the lower section, that is, section 38, is adapted for full flexing action. The amount of flexing of the sheath, that is, the angle subtended by an arc formed by the terminal section 38, is controlled by the rotation of the knob 34 and the radius of curvature of this arc will depend upon the length of the individual tube elements and the distance therebetween as measured along the portions of the flexure strips 24 which flex under the control of the knob 34. During assembly of the various parts of the sheath 10, the distance between the tube elements may be gauged according to a predetermined plan for any particular class of cavities to be examined. Experimentally, it has been found that best results may be had if the angular relationship between the axes of any two tube elements does not exceed 7°. See Fig. 5.

In Fig. 5, a few tube elements in the terminal section 38 are shown in a flexed condition of the sheath 10 and it is noted that the axis 42 of each of the tube elements is angularly related to the adjacent tube elements. The maximum angularity may be determined by the original spacings between the adjacent end surfaces of the tube elements. Consequently, if it is desired to use any particular radius of curvature of flexing for any particular class of cavities, resort should be made to the length of the tube elements and the spacings therebetween as measured along the flexure strips 24.

The spacings between the tube elements in the portion 40 of the sheath are relatively short, in fact, only a few thousandths of an inch for tube elements having an outer diameter of approximately ⅜ of an inch. Upon pulling of either of the cables 22 for flexing the terminal section 38, there will be slight flexing of the section 40 or at least not enough to present undue pressure against the walls of the pharnyx and esophagus in the event the present invention is to be utilized as a gastroscope. The purpose for permitting slight flexing of this section of the sheath 10 is to present a slight limp to this section and thereby allow the sheath to assume the natural configuration of these portions of the alimentary canal during movement of the instrument therethrough.

As shown in Figs. 1 and 4, the apertures 16 in each of the tube elements 12 are arranged in two series of aligned openings each of the series being diametrically opposite one another adjacent the long axis 44 of the oval cross-section. Similarly, the apertures 18 are diametrically opposed and occupy corresponding positions with respect to the long axis of the oval cross-section, which axis, it will be noted, passes through the center lines of the slots 20. A cable 46 is strung through each series of the apertures 16 and one end of each of the cables 46 projects beyond the terminal element 30 of the sheath 10 and into the interior of the housing 48 of an objective head 50 located at the distal end of the sheath where the head 50 is secured for movement therewith. The cables 46 are threaded through suitable openings in a mounting ring 52 secured to the interior wall of the housing 48 and are wrapped around a cylinder 54 rotatably secured to the ring 52 and coaxial with housing 48. The ends of the cable 46 are connected together and secured to the cylinder as at 56.

A circular plate 58 is secured to the extreme end of the cylinder 54 and upon this plate are secured a mirror 60 and a pair of lamps 62. Upon rotation of the cylinder 54, both the mirror and the lamps will rotate about the axis of the cylinder. The extreme tip 51 of the housing 48 is formed with transparent material which will permit transmission of light therethrough. The mirror 60 serves to transmit image forming rays from an object to be observed through the transparent tip 51 and upon a suitable objective lens system 61 located within the cylinder 54. It will be apparent that with the cables 46 wrapped around the cylinder 54 and connected thereto, any pulling force exerted upon either of these cables will correspondingly rotate the cylinder in a corresponding direction, as the case may be. A pair of electrical wires 64 are respectively connected to the lamps 62 and are threaded through the apertures 18 formed in the tube elements 12. The above-described features of the objective head 50 are generally well known in the endoscopic art and a description of the operation thereof will not be necessary except that the mirror 60 is adapted to be rotated 180° to either side and to reflect an object A which may be sections of tissue of a patient's stomach walls B.

The other ends of the cables 46 are secured and looped around a pair of spaced pulleys 66 positioned within the chamber 27 of the control housing 26. The pulleys 66 are suitably connected to a control knob 68 by a shaft 70 which may be rotatably secured and axially immobilized to the walls of the housing by any suitable means. In order to accommodate the control cables 22, 46 and permit easy movement therein, each of the castings for the central housing 26 is formed with passageways 72 for loosely receiving the cables 22 and mating grooves 74 which, when the castings are joined, serve to loosely receive the cables 46. The passageways 72 and grooves 74 connect the interior chamber 27 with each of the corresponding series of apertures formed in the tube elements 12. The ends of the wires 64 project through the walls of the housing 26 and are suitably soldered to electrical plugs 76 which may be connected to any source of electric current for providing the objective head with sufficient light, as is customary in the art. To complete the sheath structure, a suitable casing or jacket S made of rubber or plastic compound surrounds the sheath 10 and serves to prevent any moisture or body fluids from entering the instrument. The foregoing sheath structure is similar to the tube structures and modifications thereof disclosed and claimed in the co-pending application Serial No. 679,566, filed on August 22, 1957, by the same inventor and assigned to the same assignee.

*Optical system*

The optical system for the present endoscope comprises, principally, a flexible bundle 80 of optically aligned transparent glass fibers. The flexible bundle is formed as a composite unit by a pair of clamps 82, 84 one of which is secured tightly to the bundle adjacent each end surface 86, 88 of the bundle, respectively. The flexible bundle of glass fibers for transmitting light rays is a relatively new optical element and has been termed "fiberscope" in the art. Each of the glass fibers of a bundle of this sort has the ability to transmit light from one end thereof to the other end by multiple total internal reflections within the fiber. When the fibers are optically formed or grouped into a bundle and clamped at both ends, each of the fibers isolates an element or extremely small area of an image and conveys it along the entire length of the fiber. The object may be imaged upon one end surface of the bundle and the image forming rays will emerge from the exit end of the bundle so that the image may be seen by the eye directly or through the aid of a magnifying eyepiece.

For purpose of the present invention, the end surface 88, adjacent the terminal tube element 30, is adapted to have focused thereon, by the objective lens system 61, the image forming light rays of the object A, and the image forming light rays emerging from the end surface 86 are adapted to be viewed through the intermediary of an eyepiece lens assembly 90 located within an eyepiece housing 92 mounted on the housing 26.

The flexible bundle 80 is retained within the sheath 10 and fully extends throughout the length thereof and is flexible therewith. The bundle clamp 84 is secured interiorly and at one end of the objective housing 48 while the other end clamp 82 is secured interiorly of the eyepiece housing 92.

In actual practice in the use of flexible glass fiber bundle where the same is confined as in a tube and the distance between the clamped ends measured axially is fixed, the flexible bundle being so confined has presented two problems which must be considered in the design of the present endoscope for the most efficient use of the instrument. Most important of these problems is concerned with the relative axial inelasticity of individual fibers of the bundle itself and because of this and the fact that the bundle is confined, flexing of the sheath will cause the ends of those fibers on the outside of the flexed curved bundle to pull out of the end clamps. If this is not possible, the bundle will not flex and if any great force is applied in order to accomplish flexing, the outside fibers may break. In order to obviate this difficulty, the flexible bundle of fibers in a flexible confining tube structure a curved or bent portion 94 intermediate the ends and located within a spherical shell 96 formed as a part of the castings for the housing 26. The bent portion 94 is splayed, in order to enhance and contribute to the ability of the bent portion to absorb or permit override of the individual fibers in all flexed or non-flexed conditions of the bundle.

The other problem also arises because of the use of a flexible bundle of fibers in a flexible confining tube structure. After repeated flexing of the tube structure while in a vertical position, the bundle has a tendency to pack and settle at the lower region of the tube structure with consequent rupturing of the outside fibers along the inner walls of the tube structure. In order to obviate this difficulty, a clamp 98 is applied to the bundle 80 at a point slightly below the bent portion 94 and the clamp is resiliently mounted in the open end 28 of the housing 26. Resiliency is attained by the use of a flexible diaphragm 100 having an opening 102 axially thereof and its periphery 104 bonded to the inner surface of a ring 106 which in turn is secured within annular groove 108 formed in the housing. The clamp 98 is secured to the diaphragm coaxially with the opening 102 which permits the passage of the bundle 80 therethrough.

The diaphragm 100 may be made of rubber or corrugated thin metal material and serves to exert an axial force upon the bundle 80 when the sheath 10 is in a non-flexed condition. In Figs. 2 and 3, the diaphragm 100 and bent portion 94 of the bundle are shown in their respective assumed positions during flexed and non-flexed conditions of the bundle. As shown in Fig. 3, the diaphragm is normally slightly concave downwardly and exerts an upward force upon the entire bundle, thereby eliminating any tendency of the bundle to settle down within the distal or objective end of the sheath. In Fig. 2, the contour of the upper region of the bundle is shown when the sheath has been flexed in the direction indicated by the arrow and it will be noted that this flexing has caused the concavity of the diaphragm to increase as well as tilt the clamp 98. This lowering movement and the movement of the bent portion 94 slightly to the right as shown in Fig. 2, is absorbed because of the slightly excess portion of the bundle inherently contained within the bent portion 94.

A modification of the curved portion 94 is shown in Fig. 6 wherein the bent or curved portion assumes the shape of a loop 120 positioned within the interior of a casing 122 which, in turn, is fixed within the central housing 124. In this modification, the eyepiece 126 has its axis parallel or in alignment with the axis of the glass fiber bundle 80. This arrangement permits viewing of the image formed on the exit end 86 of the bundle 80 from the top or end side of the control housing. The loop 120 permits the lowering of the bundle at this point and the override of those individual fibers which are on the outside of the flexed curved bundle for all flexed conditions thereof.

The present invention by combining a flexible bundle of fibers and the specific sheath structure permits endoscopic observation of heretofore inaccessible regions such as the far walls of the stomach. The sheath structure is adapted for controlled flexing in two directions and by utilizing tube elements having certain predetermined dimensions, the terminal section 38 is capable of attaining better than a 180° semi-circle configuration in either direction and as "tight" as desired. The optical system is adapted to transmit image light rays regardless of the configuration assumed by the sheath structure and with substantially the same light transmission for all configurations.

While there is in this application specifically described one form which the invention may assume in practice, it will be understood that this form is shown for purposes of illustration, and that the same may be modified and embodied in various other forms or employed in other uses without departing from the spirit of the scope of the appended claims.

I claim:

1. An optical viewing device of the character described comprising in combination a sheath including a plurality of individual tube elements arranged in end to end relationship, a pair of flexible elements operatively associated with said tube elements and arranged longitudinally along at least a portion of the length of the sheath in diametrically opposed positions, said flexible elements being adapted to flex at portions thereof between the adjacent ends of said tube elements for permitting pivotal movement between said tube elements, means operatively associated with said tube elements for imparting pivotal movement between said tube elements to thereby cause flexing of the sheath in either direction on opposite sides of the longitudinal axis of the sheath an optical system including a flexible bundle of fibers made of transparent material arranged within said sheath, extending therealong and flexible therewith, an objective mounted at one end of the sheath and adapted to form an image of an object to be examined upon the adjacent end of said bundle of fibers, an eyepiece mounted at the other end of the sheath for viewing the image formed at the other end of said bundle, and means for controlling said flexing of the sheath for flexing said bundle in either of said directions to thereby cause said objective to assume various predetermined positions.

2. An optical viewing device of the character described comprising in combination a sheath including a plurality of individual tube elements arranged in end to end relationship, each of said tube elements being provided with a plurality of openings each of which is aligned with the corresponding opening of the adjacent tube element to form a plurality of series of aligned openings extending longitudinally of the sheath, a flexible element extending through each of said series of openings, means for securing one end of each of said flexible elements to the adjacent tube element whereby a pulling force exerted upon one of said flexible elements will produce flexing of the sheath, spacing means positioned between adjacent ends of the successive tube sections and arranged in diametrically opposed positions, means for retaining said tube elements to maintain the length of the sheath along its axis substantially constant in the flexed or non-flexed condition thereof, and an optical system including a flexible bundle of fibers made of transparent material arranged within said sheath, extending therealong and flexible therewith, an objective mounted at one end of the sheath and being adapted to form an image of an object to be examined upon the adjacent end of said bundle of fibers, and an eyepiece mounted at the other end of the sheath for viewing the image formed at the other end of said bundle, and means for controlling said flexing of the sheath for flexing said bundle in either of said directions to thereby cause said objective to assume various predetermined positions.

3. An optical viewing device of the character described comprising in combination a sheath including a plurality of individual tube elements arranged in end to end relationship, each of said tube elements being provided with a plurality of openings each of which is aligned with the corresponding opening of the adjacent tube element to form a plurality of series of aligned openings extending longitudinally of the sheath, a flexible element extending through each of said series of openings, means for securing one end of each of said flexible elements to the adjacent tube section whereby a pulling force exerted upon one of said flexible elements will produce flexing of the sheath in one direction and a pulling upon another of said flexible elements will produce flexing in another direction, means for controlling the extent of said flexing in either of said directions, and an optical system including a flexible bundle of fibers made of transparent material arranged within said sheath, and flexible therewith, an objective mounted at one end of the sheath and being adapted to form an image of an object to be examined upon the adjacent end of said bundle of fibers, and an eyepiece mounted at the other end of the sheath for viewing the image formed at the other end of said bundle.

4. An optical viewing device of the character described comprising in combination a flexible sheath, means for controlling said flexing of the sheath, an optical system including a flexible bundle of fibers made of transparent material arranged within said sheath, extending therealong and flexible therewith, connecting means for mounting one end of said bundle to the adjacent end of said sheath, and the opposite end of said bundle outside of said sheath, said bundle including a region of substantially less fiber length than the length of the overall bundle and of a fiber length greater than the overall length of said region for permitting override movement of a portion of said bundle during flexing of said sheath and said bundle, an objective mounted at said one end of the sheath and adapted to form an image of an object to be examined upon the adjacent end of said bundle of fibers, an eyepiece mounted at the other of said ends of the sheath for viewing the image formed at the other end of said bundle.

5. An endoscope or the like comprising in combination a flexible sheath, an optical system including a flexible bundle of fibers made of transparent material arranged within said sheath, extending therealong and flexible therewith, a clamp at each end of said bundle for clamping together the adjacent ends of the individual fibers of said bundle, said bundle of fibers having an end portion arranged in a curved configuration and lying outside of said sheath for permitting override movement of a portion of said bundle during flexing of the sheath and said bundle, an objective mounted at one end of the sheath and being adapted to form an image of an object to be examined upon the adjacent end of said bundle of fibers, and an eyepiece mounted on the other end of the sheath for viewing the image formed at the other end of said bundle.

6. An endoscope or the like comprsing in combination a sheath including a plurality of individual tube elements arranged in end to end relationship, a pair of flexible elements operatively associated with said tube elements and arranged longitudinally along at least a portion of the length of the sheath in diametrically opposed positions, said flexible elements being adapted to flex at portions thereof between the adjacent ends of said tube elements for permitting pivotal movement between said tube elements, means operatively associated with said tube elements for imparting pivotal movement between said tube elements thereby causing flexing of the sheath, an optical system including a flexible bundle of fibers made of transparent material arranged within said sheath, extending therealong and flexible therewith, a clamp at each end of said bundle for clamping together the adjacent ends of the individual fibers of said bundle, said bundle of fibers having a curved portion intermediate the clamped ends thereof for permitting override movement of a portion of said bundle during flexing of the sheath and said bundle, an objective mounted at one end of the sheath and being adapted to form an image of an object to be examined upon the adjacent end of said bundle of fibers, a housing mounted at the other end of the sheath and in communication with the interior thereof, said housing being constructed to receive one end of said bundle of fibers and said curved portion, and an eyepiece mounted on said housing for viewing the image formed at the other end of said bundle.

7. An endoscope or the like comprising in combination a sheath including a plurality of individual tube elements arranged in end to end relationship, a pair of flexible elements operatively associated with said tube elements and arranged longitudinally along at least a portion of the length of the sheath in diametrically opposed positions, said flexible elements being adapted to flex at portions thereof between the adjacent ends of said tube elements for permitting pivotal movement between said tube elements, means operatively associated with said tube elements for imparting pivotal movement between said tube elements thereby causing flexing of the sheath, an optical system including a flexible bundle of fibers made of transparent material arranged within said sheath, extending therealong and flexible therewith, a clamp at each end of said bundle for clamping together the adjacent ends of the individual fibers of said bundle, said bundle of fibers having a curved portion adjacent one end thereof, the plane of said curved portion being at an acute angle with respect to the plane of flexing of said bundle, an objective mounted at one end of the sheath and being adapted to form an image of an object to be examined upon the adjacent end of said bundle of fibers, a housing mounted at the other end of the sheath and in communication with the interior thereof, said housing being adapted to receive one end of said bundle of fibers and said curved portion, and an eyepiece mounted on said housing for viewing the image formed at the other end of said bundle.

8. An endoscope or the like comprising in combination a flexible sheath, an optical system including a flexible bundle of fibers made of transparent material arranged within said sheath, extending therealong and flexible therewith, a clamp at each end of said bundle for clamping together the adjacent ends of the individual fibers of said bundle and for securing the ends of said bundle relative to the sheath, one end of said bundle being secured within said sheath adjacent to one end thereof, and the opposite end of said bundle being secured outside of said sheath adjacent to the end thereof opposite from said one end thereof whereby a portion of said bundle lies outside of said sheath means for yieldably tensioning the portion of said bundle lying within said sheath and maintaining said portion of said bundle outside of said sheath in a normally slack condition thereby to permit override movement of said fibers relative to each other to facilitate flexing of said bundle conforming to flexing of said sheath, an objective mounted at one end of the sheath and being adapted to form an image of an object to be examined upon the adjacent end of said bundle of fibers, and an eyepiece mounted at one end of the sheath for viewing the image formed at the other end of said bundle.

9. An endoscope or the like comprising in combination a sheath including a plurality of individual tube elements arranged in end to end relationship, a pair of flexible elements operatively associated with said tube elements and arranged longitudinally along at least a portion of the length of the sheath in diametrically opposed positions, said flexible elements being adapted to flex at portions thereof between the adjacent ends of said tube elements for permitting pivotal movement between said tube elements, means operatively associated with said tube elements for imparting pivotal movement between said tube elements thereby causing flexing of the sheath, an optical system including a flexible bundle of fibers made of transparent material arranged within said sheath, extending therealong and flexible therewith, a clamp at each end of said bundle for clamping together the adjacent ends of the individual fibers of said bundle and for securing the ends of said bundle relative to the ends of the sheath, respectively, means operatively associated with said bundle intermediate the ends thereof for continuously exerting an axial force thereupon for all flexed and unflexed conditions of said bundle, said bundle of fibers having an angled portion intermediate the clamped ends thereof for permitting override movement of a portion of said bundle during flexing of the sheath and said bundle, an objective mounted at one end of the sheath and being adapted to form an image of an object to be examined upon the adjacent end of said bundle of fibers, and an eyepiece mounted at one end of the sheath for viewing the image formed at the other end of said bundle.

10. An endoscope or the like comprising a housing, a flexible sheath secured to and depending from the housing, means for flexing the sheath, an optical system including lens means carried within and at the free end of the sheath, additional lens means within the housing, and a bundle of flexible transparent fibers positioned within the sheath and extending into said housing and in optical alignment with both said lens means, the lower end of the bundle being connected to the adjacent end of the sheath, the other end of the bundle being connected to the housing, and resilient means carried by the housing for yieldably tensioning the portion of said bundle lying within said sheath and normally maintaining a portion of said bundle lying within said housing in a slack condition whereby said portion of the bundle within said sheath will be held relatively taut for all flexed conditions of the sheath and slack is available for override movement of said fibers relative to each other during flexing of said sheath and bundle.

11. The structure recited in claim 10 wherein the bundle of fibers has a curved portion within the housing intermediate the resilient means and the adjacent end of the bundle.

References Cited in the file of this patent

UNITED STATES PATENTS

| | | |
|---|---|---|
| 944,830 | Sussmann | Dec. 28, 1909 |
| 1,751,584 | Hansell | Mar. 25, 1930 |
| 2,825,260 | O'Brien | Mar. 4, 1958 |
| 2,877,368 | Sheldon | Mar. 10, 1959 |

FOREIGN PATENTS

| | | |
|---|---|---|
| 548,462 | Great Britain | Oct. 12, 1942 |
| 179,905 | Austria | Oct. 25, 1954 |

UNITED STATES PATENT OFFICE
CERTIFICATE OF CORRECTION

Patent No. 2,975,785                      March 21, 1961

Gilbert J. Sheldon

It is hereby certified that error appears in the above numbered patent requiring correction and that the said Letters Patent should read as corrected below.

Column 5, line 18, for "of fibers in a flexible confining tube struc-" read -- in the present invention is provided with --.

Signed and sealed this 14th day of November 1961.

(SEAL)
Attest:

ERNEST W. SWIDER
Attesting Officer

DAVID L. LADD
Commissioner of Patents

USCOMM-DC